United States Patent [19]
Sekikawa

[11] Patent Number: 5,694,236
[45] Date of Patent: Dec. 2, 1997

[54] OPTICAL SCANNING DEVICE

[75] Inventor: Yoshihito Sekikawa, Iwatsuki, Japan

[73] Assignee: Fuji Xerox Co., Ltd., Tokyo, Japan

[21] Appl. No.: 720,005

[22] Filed: Sep. 27, 1996

[30] Foreign Application Priority Data

Sep. 29, 1995 [JP] Japan ................................. 7-253730

[51] Int. Cl.$^6$ ............................................... G02B 26/08
[52] U.S. Cl. ......................... 359/206; 359/208; 359/216; 359/217
[58] Field of Search ........................... 359/205–208, 359/216–219, 662, 710, 717; 347/258–261

[56] References Cited

U.S. PATENT DOCUMENTS

| | | | |
|---|---|---|---|
| 4,512,625 | 4/1985 | Brueggemann | 359/208 |
| 4,796,962 | 1/1989 | DeJager et al. | 359/206 |
| 4,984,858 | 1/1991 | Kuroda | 359/208 |
| 5,546,215 | 8/1996 | Ota | 359/208 |

Primary Examiner—James Phan
Attorney, Agent, or Firm—Finnegan, Henderson, Farabow, Garrett & Dunner, L.L.P.

[57] ABSTRACT

An optical scanning device having: a beam diameter shaping optical system which shapes a diameter of a light beam from a light source and focuses the light beam as a line image which is long in a direction corresponding to a main scanning direction; polygon mirror having a reflecting surface at one of a focusing position and a vicinity of the focusing position of the line image, the polygon mirror deflecting a light beam, which is incident on the polygon mirror, at a uniform angular speed in the direction corresponding to the main scanning direction; a cylindrical mirror disposed at a light beam reflecting side of the polygon mirror, the cylindrical mirror having power to converge a light beam in only a subscanning direction which is orthogonal to the main scanning direction, and converging a light beam on a surface-to-be-scanned; and an f θ lens system disposed between the polygon mirror and the cylindrical mirror, and having power to converge a light beam only in a main scanning direction, and converging a light beam, which is incident on the f θ lens system, onto the surface-to-be-scanned via the cylindrical mirror so that a light spot is scanned at a uniform speed. Because the f θ lens system only has power in the main scanning direction, a configuration of each lens of the f θ lens system can be made simple and compact.

24 Claims, 9 Drawing Sheets

BEAM DIAMETER AT POINTS AWAY FROM FOCAL POINT POSITION ($\lambda = 780$ nm)

OPTICAL SCANNING DEVICE

BACKGROUND OF THE INVENTION

1. Field of the Invention

The present invention relates to an optical scanning device which, similarly to a copier or a laser printer, scans a laser beam so as to record, display, or read images, and in particular to an optical scanning device having an optical system for focusing, onto a scan surface such as a photosensitive body, a laser beam which has been deflected at a deflecting means such as a polygon mirror.

2. Description of the Related Art

An optical scanning device is widely used in copiers and laser printers to record an image by forming an electrostatic latent image on a photosensitive body by using a light beam.

Figure 2:
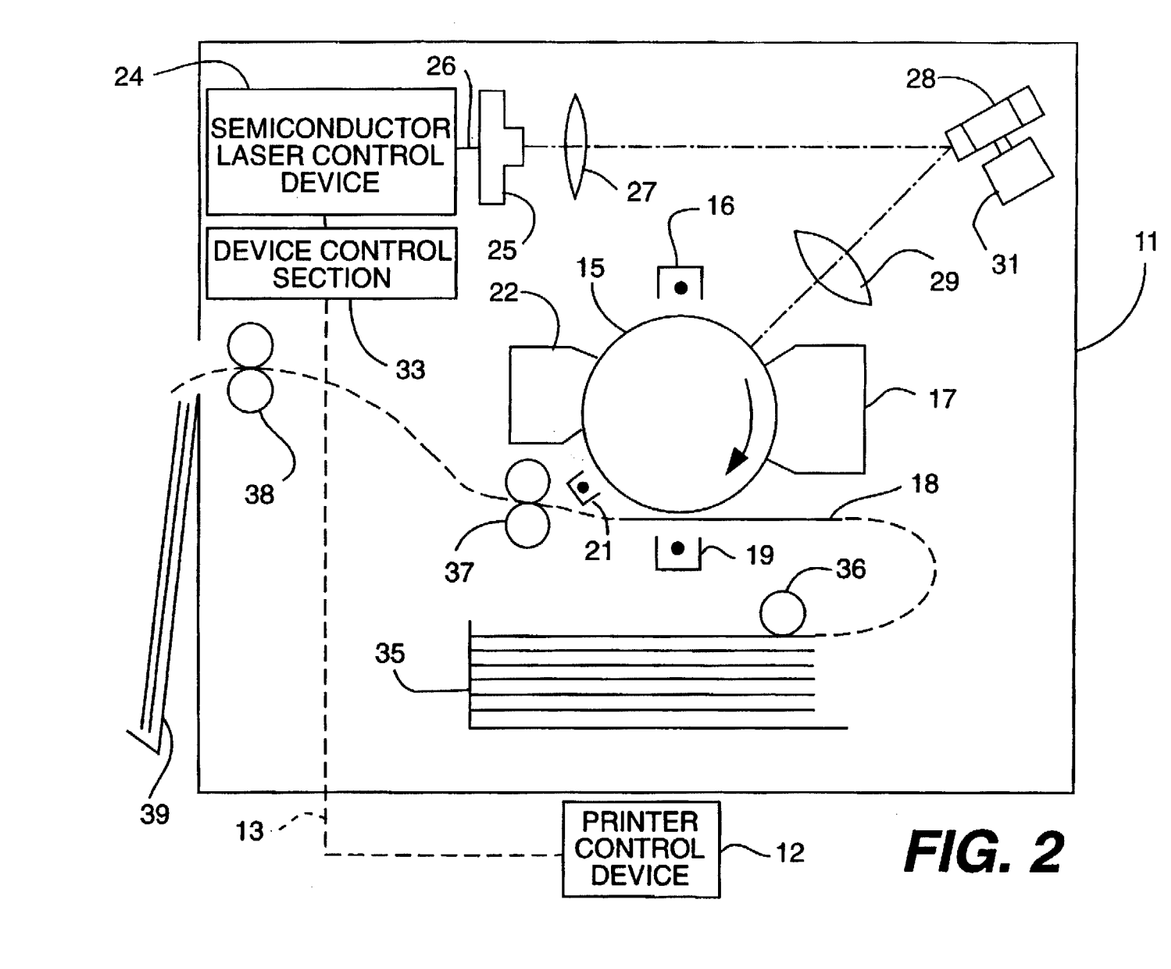
FIG. 2 is a structural view illustrating the basic structure of a conventional laser printer.

FIG. 2 illustrates the basic structure of a laser printer as one example of an optical scanning device. A laser printer 11 is connected by a cable 13 to a printer control device 12 such as a work station or a computer. The laser printer 11 receives a supply of image data and prints out images.

Most such laser printers 11 are equipped with a photosensitive drum 15 which rotates at a constant speed. A charge corotron 16, a developing device 17, a transfer corotron 19, a discharge corotron 21, and a cleaning device 22 are disposed at the periphery of the photosensitive drum 15. The charge corotron 16 charges the drum surface uniformly. The developing device 17 develops the electrostatic latent image. The transfer corotron 19 transfers the toner image obtained by developing onto a recording paper 18. The discharge corotron 21 discharges the surface of the drum after transfer. The cleaning device 22 removes the toner remaining on the drum surface. A semiconductor laser control device 24 on/off controls (modulates) a semiconductor laser 25 in accordance with the image data. A laser beam 26 outputted from the semiconductor laser 25 is incident onto a polygon mirror 28 via a shaping optical system 27 such as a collimator lens or the like. After being reflected at the polygon mirror 28, the laser beam 26 is focused onto the photosensitive drum 15 via a focusing optical system 29.

The polygon mirror 28 rotates at high speed by a polygon mirror driving motor 31. Therefore, the laser beam reflected from the polygon mirror 28 is deflected thereat, and scans the surface of the drum between the charge corotron 16 and the developing device 17 in units of one or more lines. As a result, an electrostatic latent image corresponding to the image data is formed on the surface of the photosensitive drum 15, and the electrostatic latent image is then developed by the developing device 17.

The semiconductor laser control device 24 is controlled by a device controlling section 33 for controlling the entire laser printer 11. The paper feed system of the laser printer 11 is controlled in the same way. More specifically, the recording paper 18 accommodated in a cassette tray 35 is fed one sheet at a time by a feed roller 36, and advances along the path illustrated by the dotted line in FIG. 2. Then, first, the recording paper 18 passes between the photosensitive drum 15 and the transfer corotron 19, and the toner image is transferred thereto. The recording paper 18 then passes through a fixing device 37 formed by a pair of rollers so that fixing of the toner image is carried out by heat or pressure. The recording paper 18 on which recording has been carried out in this way is then fed out from discharge rollers 38 into a discharge tray 39.

Conventionally, an f θ lens system is often used in the focusing optical system 29. The f θ lens system has the following two functions: converging the laser beam 26 as a light spot onto a photosensitive body such as the photosensitive drum 15, and moving the light spot at a uniform speed on the surface of the photosensitive body. Such a focusing optical system 29 is usually structured such that a position on the photosensitive body and a position of the deflecting point in a plane orthogonal to the surface scanned by the laser beam 26 are in a substantially conjugate relationship. The focusing optical system 29 forms a so-called tilting error correcting optical system for correcting at the optical system the tilt of the reflecting surfaces of the polygon mirror.

Optical systems utilizing a cylindrical lens or a toric lens have been conventionally used as tilting error correcting optical systems.

However, in a case in which a cylindrical lens is used, it is difficult to obtain a good focusing ability. On the other hand, toric lenses are extremely difficult to manufacture.

Japanese Patent Application Publication (JP-B) No. 4-56962 discloses an optical system in which a cylindrical mirror and an f θ lens system are combined.

Figure 6:
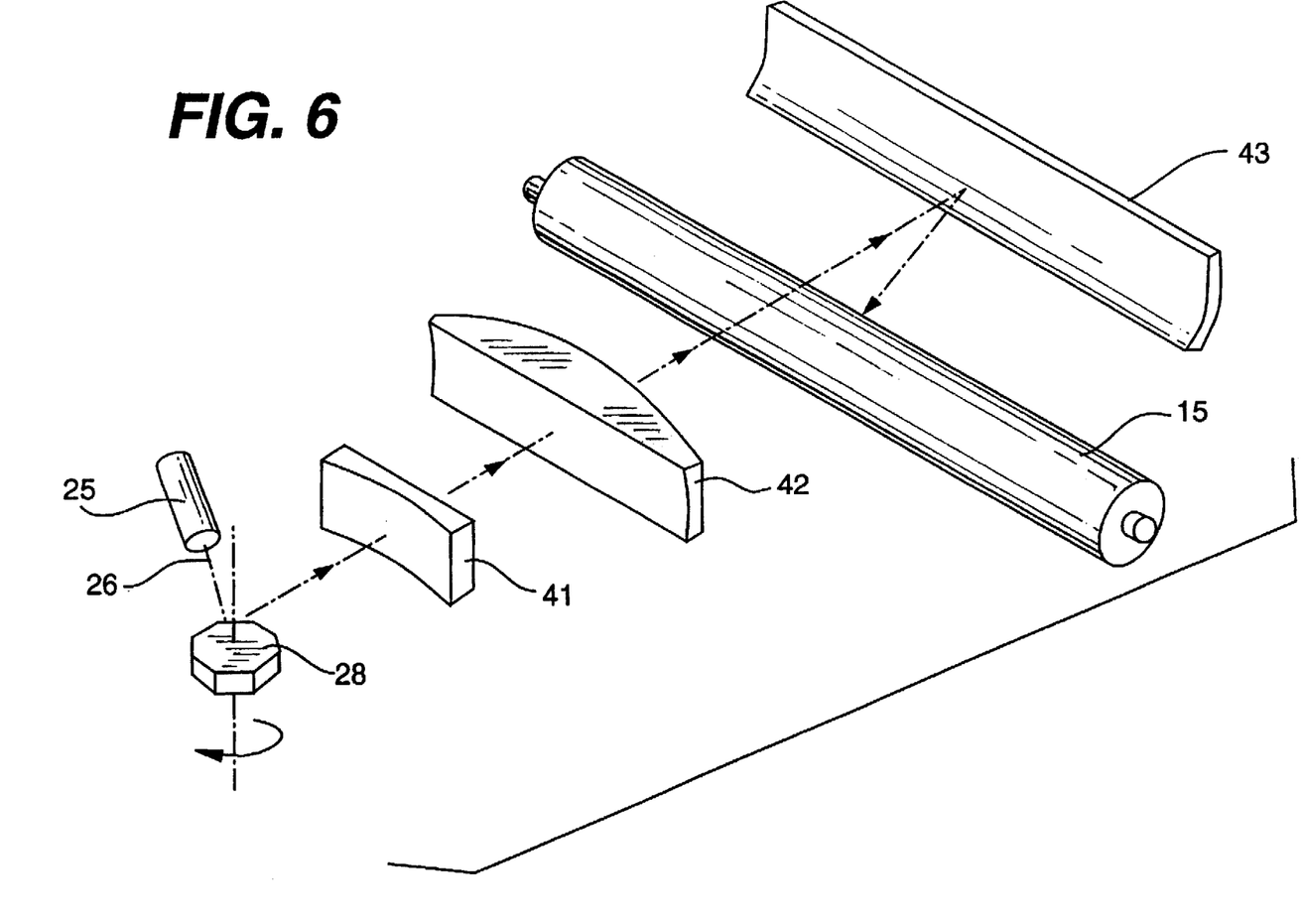
FIG. 6 is a perspective view illustrating main portions of an optical system in a conventional optical scanning device.

FIG. 6 illustrates an optical system disclosed in JP-B No. 4-56962 in which a cylindrical mirror and an f θ lens system are combined. Portions in FIG. 6 which are the same as those in FIG. 2 are denoted by the same reference numerals, and description thereof is omitted. In the optical scanning device of JP-B No. 4-56962, after the laser beam reflected from the polygon mirror 28 passes through a concave lens element 41 and a convex lens element 42, the laser beam is reflected by a concave cylindrical mirror 43 so as to arrive at the photosensitive drum 15, and scans the drum surface in the axial direction line-by-line.

Here, (1) the concave lens element 41, (2) the convex lens element 42, and (3) the cylindrical mirror 43 may be (1) a spherical lens, (2) a lens formed by a cylindrical surface and a spherical surface, and (3) a cylindrical mirror, respectively, or may be (1) a lens formed by a cylindrical surface and a planar surface, (2) a lens formed by a cylindrical surface and a cylindrical surface having power in a direction orthogonal to the previous cylindrical surface, and (3) a cylindrical mirror, respectively.

However, in the conventional optical system illustrated in FIG. 6, in either case, the convex lens element 42 has a complex configuration, and a drawback arises in that manufacturing is difficult and expensive.

Figure 3A:
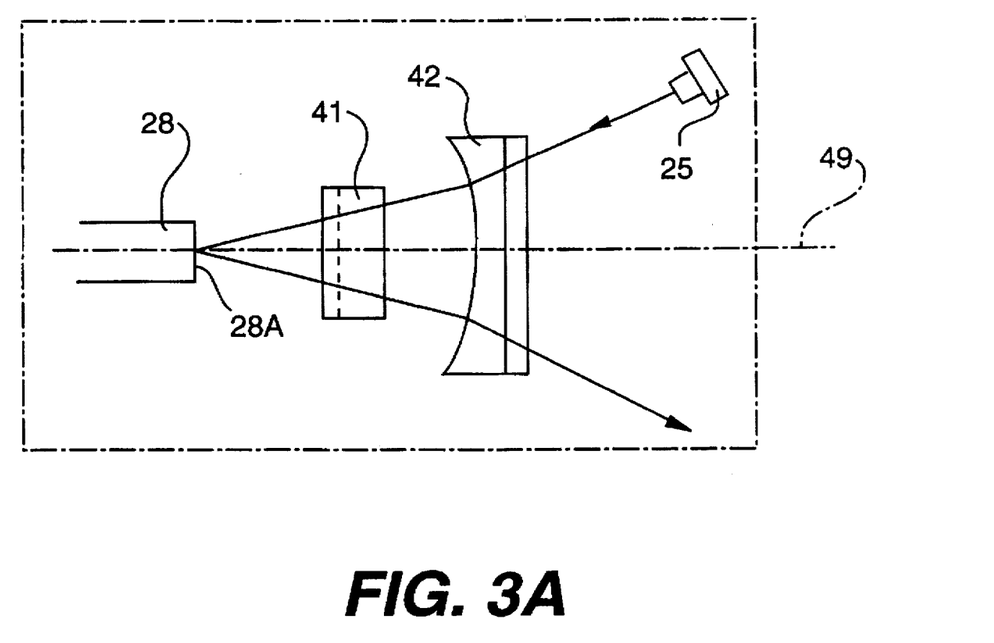
FIG. 3A is a side view of a case in which a double pass/front incident system is applied to a conventional optical system.

Further, when the above-described optical system is applied to a system structured such that a light beam passes twice through the f θ lens, i.e., once when it is incident on and once when it emerges from the rotating polygon mirror, (double pass) and structured such that the light beam is incident on the rotating polygon mirror from the center of the scanning angle (front incident), as illustrated in FIG. 3A, in order to refract the beam in the subscanning direction, the f θ lens and the optical scanning device cannot be made thin or flat. Drawbacks arise in that the optical scanning device is expensive and leads to an increase in size of the image forming apparatus.

SUMMARY OF THE INVENTION

In view of the aforementioned, an object of the present invention is to provide an optical scanning device in which tilting error in the subscanning direction can be corrected with high accuracy and which can be manufactured very easily and made compact.

In order to achieve the above object, an optical scanning device of the first aspect of the present invention comprises:

a beam diameter shaping optical system which shapes a diameter of a light beam from a light source and focuses the light beam as a line image which is long in a direction corresponding to a main scanning direction; deflecting means having a reflecting surface at one of a focusing position and a vicinity of the focusing position of the line image, the deflecting means deflecting a light beam, which is incident on the deflecting means, at a uniform angular speed in the direction corresponding to the main scanning direction; a cylindrical mirror disposed at a light beam reflecting side of the deflecting means, the cylindrical mirror having power to converge a light beam in only a subscanning direction which is orthogonal to the main scanning direction, and converging a light beam on a surface-to-be-scanned; and an f θ lens system disposed between the deflecting means and the cylindrical mirror, and having power to converge a light beam only in a main scanning direction, and converging a light beam, which is incident on the f θ lens system, onto the surface-to-be-scanned via the cylindrical mirror so that a light spot is scanned at a uniform speed.

In the above-described first aspect, when the light beam from the light source is emitted, the beam diameter shaping optical system shapes the diameter of the light beam from the light source, and the light beam is focused, at the reflecting surface of the deflecting means or in a vicinity of the reflecting surface, as a line image which is long in a direction corresponding to the main scanning direction. The focused light beam is reflected at the reflecting surface of the deflecting means, is deflected by the deflecting means at a uniform angular speed in a direction corresponding to the main scanning direction, and passes through the f θ lens system. The light beam which has passed through the f θ lens system is scanned at a uniform speed onto the surface-to-be-scanned by the f θ lens system, and is affected by the power of the f θ lens system only in the main scanning direction so as to be converged only in the main scanning direction on the surface-to-be-scanned, and reaches the cylindrical mirror. The light beam which has reached the cylindrical mirror is reflected by the cylindrical mirror onto the surface-to-be-scanned. Here, because the cylindrical mirror only has power in the subscanning direction, the subscanning direction positional deviation of the light spot converged on the surface-to-be-scanned, which positional deviation is caused by the tilting error of the reflecting surface of the deflecting means, is corrected and made small. In this way, in the optical scanning device relating to the present aspect, even if a lens having power in only the main scanning direction is used in the f θ lens system, the positional deviation of the light spot irradiated onto the surface-to-be-scanned can be corrected so as to be small. In this way, when the f θ lens system is manufactured, there is no need for working in order to provide the f θ lens system with power in the subscanning direction. Because the configurations of the respective lenses of the f θ lens system can be made simple, manufacturing of the f θ lens system is extremely easy.

In a second aspect of the present invention, the f θ lens system of the first aspect is formed by two lenses, and one surface of each lens is planar, and another surface of each lens is formed by a surface having power to converge a light beam only in the main scanning direction.

In the above-described second aspect, only respective ones of the surfaces of each of the lenses of the f θ lens system have power in the main scanning direction, and the others of the surfaces are planar. Further, the f θ lens system is formed by only two lenses. Therefore, the manufacturing of the lenses of the f θ lens system is facilitated even more. In particular, by structuring the f θ lens system of the present second aspect such that the planar surfaces of the two lenses oppose one another, the f θ lens system can be made most compact.

In a third aspect of the present invention, in either the first or the second aspect, given that magnification M in the subscanning direction is a value which is equal to an optical distance between the surface-to-be-scanned and a reflecting surface of the cylindrical mirror divided by an optical distance between the reflecting surface of the cylindrical mirror and the reflecting surface of the deflecting means, $0.2 < M < 0.6$.

In the above-described first and second aspects, in order to keep the curvature of field small and simultaneously exhibit the ability to correct the tilting error in the subscanning direction, it is particularly preferable that the magnification M in the subscanning direction satisfies the above inequality of the third aspect.

More specifically, the tolerance of the radius of curvature of the cylindrical mirror is ±1 mm, and the deviation of the conjugate point at the center and the sides in the optical system is about 1 mm. If these are added, the conjugate point of the correction of the tilting error at the center or the sides deviates about ±2 mm. Therefore, if $M \leq 0.2$, the positional deviation in the subscanning direction exceeds 6 μm, which is the minimum interval which can be discriminated by the human eye, and banding, which is one aspect of image quality, is not an acceptable level.

On the other hand, if $M \geq 0.6$, a drawback arises in that the curvature of field in the subscanning direction exceeds 2 mm. To take the case of a certain scanning angle as an example, currently, the beam diameter on the photosensitive body is usually about 50 μm. Therefore, a depth of only about ±2 mm can be guaranteed. Considering the tolerance of the parts and the tolerance of adjustments, in such a case, it is difficult to keep the increase in the beam diameter to around 15 μm, and the image quality is affected. (thin lines become thick and the like).

In the fourth aspect of the present invention, in any of the first through the third aspects, the f θ lens system is disposed such that a light beam incident on the deflecting means and a light beam reflected and deflected by the deflecting means both pass through the f θ lens system and such that the f θ lens system makes a light beam incident on the deflecting means from a center of a scan angle formed by the light beam reflected and deflected by the deflecting means.

In the fourth aspect, when the light beam is emitted from the light source, the diameter of the light beam is shaped by the beam diameter shaping optical system, and the light beam is incident on the f θ lens system from the central direction of the scan angle, i.e., from the direct front center of the f θ lens system. The light beam which has passed through the f θ lens system is focused, at the reflecting surface of the deflecting means or in a vicinity of the reflecting surface, as a line image which is long in a direction corresponding to the main scanning direction. After being reflected by the reflecting surface of the deflecting means, the light beam again passes through the f θ lens system. Here, because the f θ lens system does not have power in the subscanning direction, the light beam passing therethrough proceeds without being refracted in the subscanning direction. In this way, the deflecting means can be made compact, and the light source can be disposed at a position close to the optical axis of the f θ lens system. Therefore, the entire apparatus can be made flat. Further, the f θ lens system can be made to have a flat configuration in the subscanning direction, and can be made compact. Moreover, because the light beam is incident on the f θ lens system from directly in front, the symmetry of the optical system is ensured.

In a fifth aspect of the present invention, in the fourth aspect, the f θ lens system is disposed such that an optical axis of the f θ lens system forms a predetermined angle α with respect to a plane orthogonal to the reflecting surface of the deflecting means, and is disposed so as to be tilted in a direction in which an angle of incidence of a light beam incident on the f θ lens system is small, and given that β is an angle formed by a light beam incident on the f θ lens system with respect to a plane orthogonal to the reflecting surface of the deflecting means, the inequality α>β is satisfied.

In the fifth aspect of the present invention, when the light beam is incident on the f θ lens system, a portion of the light beam is reflected at the respective structural surfaces of the f θ lens system. Because the f θ lens system is tilted such that α>β, the reflected light does not reach the surface-to-be-scanned. Adverse effects on image quality due to the reflected light can thereby be avoided.

In a sixth aspect of the present invention, in the fifth aspect, the inequality α<5β is further satisfied.

In the sixth aspect, it is particularly preferable that this inequality is established as the upper limit of α.

More specifically, when α≧5β, as one example, the conjugate point of the correction of the tilting error deviates 2 mm or more at the center and the sides, and good image quality (good banding) cannot be maintained over the entire image area on the surface-to-be-scanned.

In a seventh aspect of the present invention, in the fourth aspect, the f θ lens system is disposed such that an optical axis of the f θ lens system forms a predetermined angle α with respect to a plane orthogonal to the reflecting surface of the deflecting means, and is disposed so as to be tilted in a direction in which an angle of incidence of a light beam incident on the f θ lens system is large, and given that B is a distance which is the optical distance, between the deflecting means and a surface of the f θ lens system furthest from the deflecting means, which optical distance has been projected on a plane orthogonal to the reflecting surface of the deflecting means, L is a distance which is the optical distance, between the reflecting surface of the deflecting means and an optical member which is furthest from the deflecting means, which optical distance has been projected onto a plane orthogonal to the reflecting surface of the deflecting means, Z is a subscanning direction size of the optical member; α is an angle at which the optical axis of the f θ lens system is tilted with respect to a plane orthogonal to the reflecting surface of the deflecting means, and β is an angle formed by a light beam incident on the f θ lens system with respect to a plane orthogonal to the reflecting surface of the deflecting means, the following inequality is satisfied: $\tan(2\alpha+\beta)\times L - \tan\beta \times (B+L) > Z/2$.

In the seventh aspect when a light beam is incident on the f θ lens system, a portion of the light beam is reflected at the respective structural surfaces of the f θ lens system. Because the f θ lens system is tilted such that the above inequality is satisfied, the reflected light advances in a direction in which the reflected light misses the optical member which is furthest from the deflecting means, and does not reach the surface-to-be-scanned. Adverse effects on image quality due to the reflected light can thereby be avoided.

In an eighth aspect of the present invention, in the seventh aspect, the inequality α<2β is further satisfied.

In the eighth aspect, it is particularly preferable that this inequality is established as the upper limit of α.

More specifically, when α≧2β, the beam diameter in the main scanning direction becomes thick at the sides, and the image quality is not of a level which is satisfactory for actual use.

DESCRIPTION OF THE PREFERRED EMBODIMENTS

First Embodiment

A first embodiment of the present invention will be described hereinafter with reference to the drawings.

Figure 1:
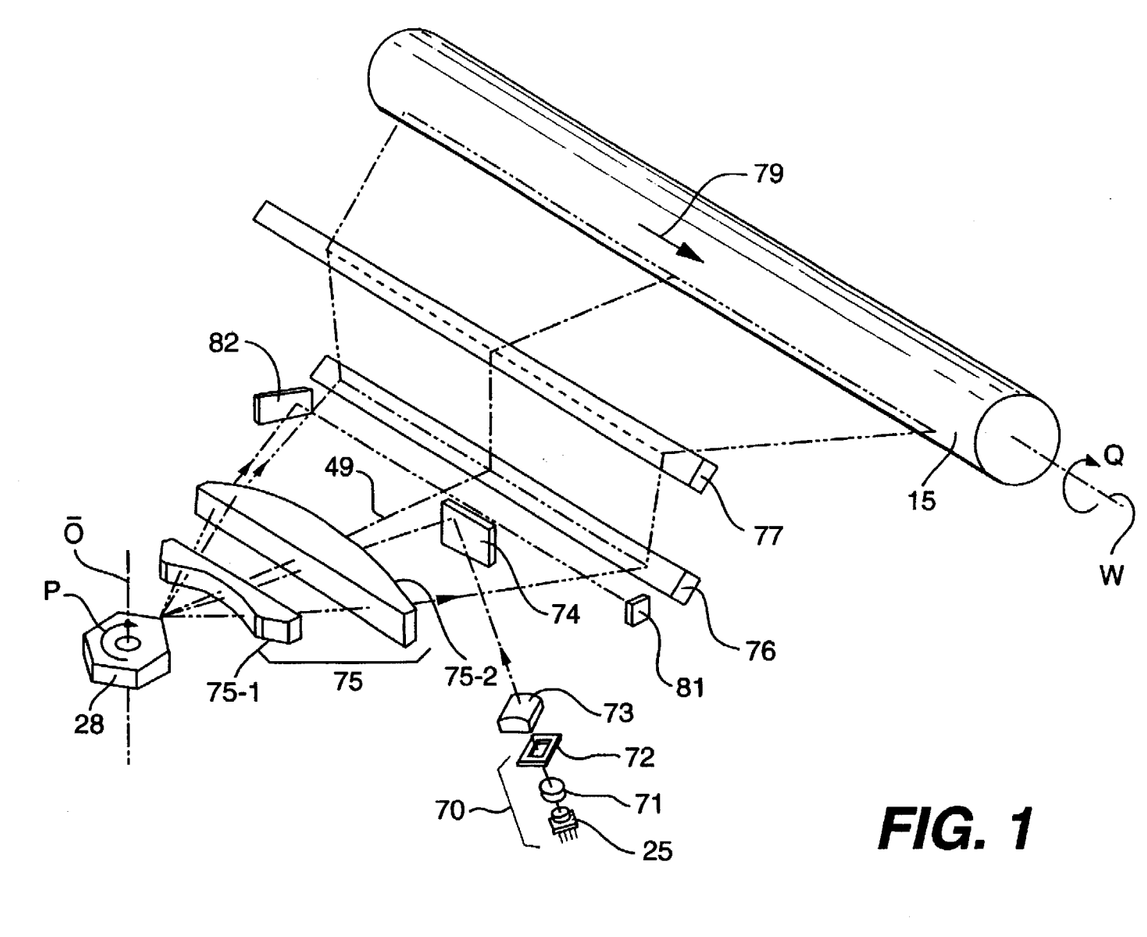
FIG. 1 is a structural view of an optical scanning device relating to a first embodiment of the present invention.

As illustrated in FIG. 1, an optical scanning device relating to the first embodiment includes a polygon mirror 28, a photosensitive drum 15, and a laser diode assembly 70. The polygon mirror 28 serves as a light beam deflecting means. A photosensitive body for image recording, on which the light beam reflected and deflected by the polygon mirror 28 is irradiated, is applied on the photosensitive drum 15. The laser diode assembly 70 is used as a light source.

The polygon mirror 28 has a regular polygon solid configuration, and each of deflecting surfaces 28A which form the side surface portions of the polygon mirror 28 is formed by a planar mirror surface. The polygon mirror 28 is rotated in the direction of arrow P at a predetermined angular speed by an unillustrated driving means such as a motor or the like around an axis of rotation O disposed substantially vertically. The light beam from the light source is deflected at a uniform angular speed by the polygon mirror 28.

Hereinafter, the plane formed by the light beam reflected and deflected by the polygon mirror 28 is referred to as the main scanning plane, the direction formed by the intersection of the main scanning plane and the photosensitive drum 15 is referred to as the main scanning direction, and the direction orthogonal to the main scanning direction is referred to as the subscanning direction. An axis, which is in a plane substantially orthogonally intersecting all of the deflecting surfaces 28A of the polygon mirror 28 and which passes through the central portion of a scan angle formed by the scanned light beam, is an optical axis 49 of the optical scanning device.

The photosensitive drum 15 has a long, thin, substantially cylindrical configuration, and a photosensitive material which is exposed by a light beam is applied to the surface of the photosensitive drum 15. The photosensitive drum 15 is disposed at the end portion of an unillustrated housing of the optical scanning device which end portion is at the side opposite the polygon mirror 28, such that the scanning direction which is denoted by arrow 79 substantially coincides with the longitudinal direction of the photosensitive drum 15. The photosensitive drum 15 rotates around a rotational axis in the direction of arrow Q at a predetermined, constant rotational speed by a driving means (not shown).

The laser diode assembly 70 is disposed at the side portion of the optical scanning device, and is formed by a semiconductor laser 25, a collimator lens 71, and an opening aperture 72 for beam formation. The semiconductor laser 25 emits a divergent bundle of rays which is divergent light whose spread angle in the direction corresponding to the main scanning direction is greater than the spread angle in the direction corresponding to the subscanning direction. The collimator lens 71 shapes the bundle of rays emitted from the semiconductor laser 25. The semiconductor laser 25 is controlled on and off in accordance with image signals from a modulating means (not shown), and is disposed further inward than the focal point position of the collimator lens 71.

A cylindrical lens 73 is disposed at a position adjacent to the light emitting side of the opening aperture 72. The cylindrical lens 73 forms a line image, which is long and thin in a direction corresponding to the main scanning direction, by the light beam passing therethrough being converged, via an f θ lens system 75 and only in the direction corresponding to the subscanning direction, at the deflecting surface 28A of the polygon mirror 28 or a vicinity thereof.

A plane mirror 74, which makes the light beam incident onto the polygon mirror 28 from the direct front thereof, is disposed at the bottom portion of the optical scanning device on the axis of the light beam emitted from the laser diode assembly 70.

The f θ lens system 75 is disposed between the plane mirror 74 and the polygon mirror 28. The f θ lens system 75 converges and focuses the light beam reflected and deflected by the polygon mirror 28 as a light spot on the photosensitive drum 15, and moves the light spot on the surface of the photosensitive drum 15 at a uniform speed. The f θ lens system 75 is disposed so that the light beam, which is incident on the polygon mirror 28 from the direct front thereof by the plane mirror 74, and the light beam, which is reflected and deflected by the polygon mirror 28, are both incident on the f θ lens system 75. More specifically, light beams pass through the f θ lens system 75 twice, i.e., once before and once after the reflecting and deflecting thereof by the polygon mirror 28. The present optical system forms on the whole a so-called front incident/double pass optical system.

Figure 4A:
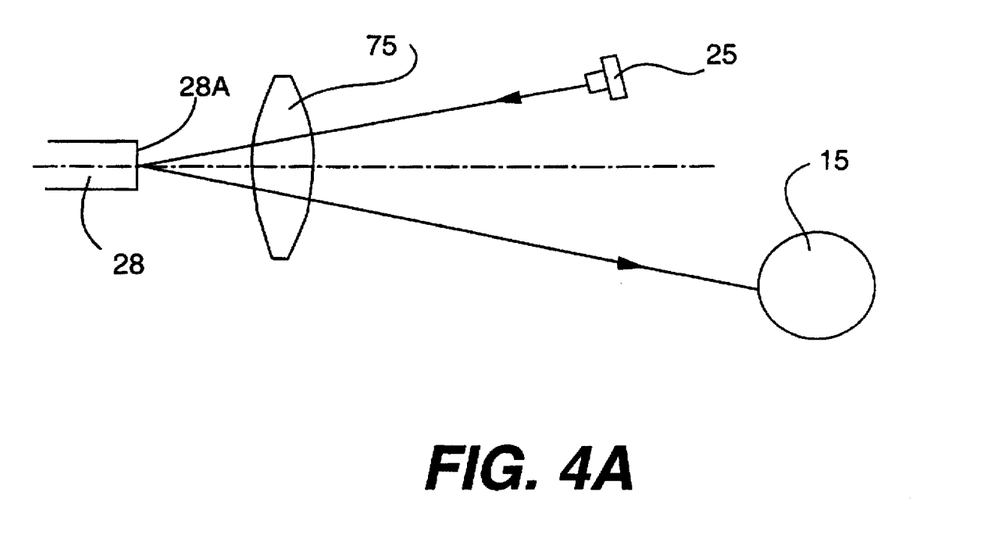
FIG. 4A is a schematic side view of the optical system of the first embodiment, for explaining advantages of the double pass/front incident system.
Figure 4B:
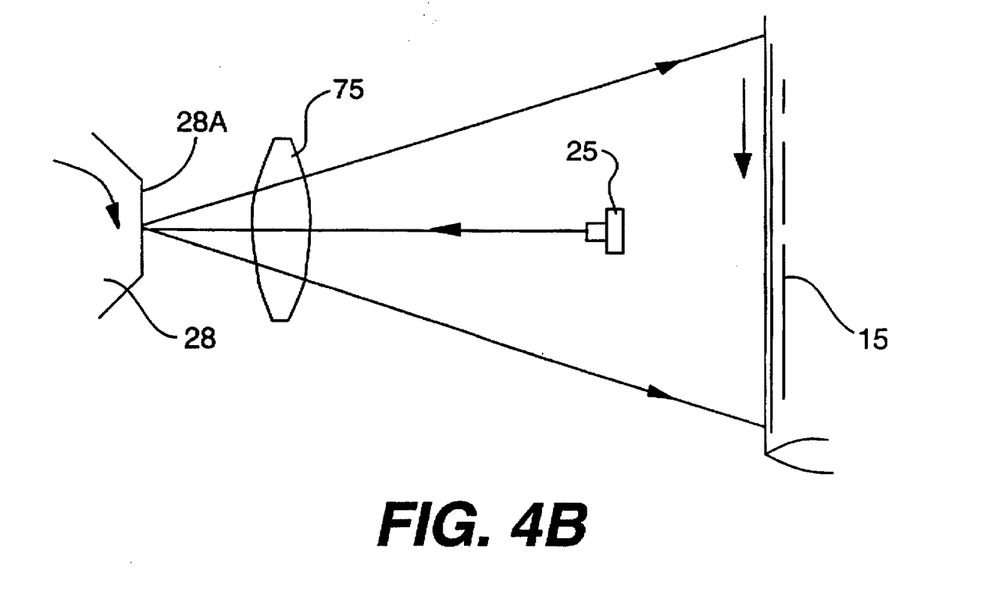
FIG. 4B is a schematic plan view of the optical system of the first embodiment, for explaining advantages of the double pass/front incident system.

In order to describe the advantages of the front incident/double pass optical system, a side view and a top view of the optical system at the reflecting side of the polygon mirror 28 are illustrated schematically in FIG. 4A and FIG. 4B, respectively.

As shown in FIG. 4A, the light beam emitted from the semiconductor laser 25 and the light beam reflected by the polygon mirror 28 both pass through the f θ lens system 75. In this way, the polygon mirror 28 can be made small proportionately to the f θ lens system 75. Further, as illustrated in FIG. 4B, because the light beam is incident on the f θ lens system 75 from the direct front center thereof, symmetry to the left and right, which is one aspect of the optical performance, can be ensured.

The f θ lens system 75 is formed from two lenses 75-1, 75-2. The surface of the lens 75-1 which surface is near the polygon mirror 28 is a concave surface having power only in the main scanning direction. The other surface of the lens 75-1 is planar. The surface of the lens 75-2 which surface is far from the polygon mirror 28 is a convex surface having power in only the main scanning direction. The other surface of the lens 75-2 is planar. As will be described later, the lenses 75-1 and 75-2 are formed as extremely flat lenses.

A plane mirror 82 is disposed at the side of the f θ lens system 75 opposite the side at which the laser diode assembly 70 is located. The plane mirror 82 reflects, in a direction orthogonal to the optical axis of the f θ lens system 75, the light beam which is converged at the start of scan (hereinafter, "SOS") position of the line at the main scanning plane in which the light beam reflected and deflected by the polygon mirror 28 is scanned.

An SOS sensor 81 which detects the SOS beam is disposed at the outer side of the region scanned by the light beam, on the optical path of the SOS beam reflected by the plane mirror 82. The SOS sensor 81 is connected to an unillustrated control device. When an SOS beam is detected, modulation of the image signal at that line begins after a predetermined period of time passes. Namely, the detecting signals of the SOS sensor 81 determine the timing of the start of scan at each line.

A plane mirror 76, which is rectangular and long and thin in the main scanning direction, is disposed in the reflecting direction of the polygon mirror 28 at the light beam emitting side of the f θ lens 75. The plane mirror 76 is tilted or disposed at an angle so as to reflect the light beam in the subscanning direction.

A cylindrical mirror 77, which is long and thin and has power only in the subscanning direction, is disposed on the optical path of the light beam reflected by the plane mirror 76 such that the longitudinal direction of the cylindrical mirror 77 substantially corresponds to the main scanning direction. Here, the power Fm of the cylindrical mirror 77 in the main scanning direction is set to satisfy the following equation:

$$Fm = \{R \times \cos(\theta/2)\}/2 \qquad \ldots (1)$$

wherein R is the radius of curvature of the cylindrical mirror 77, and θ is the angle formed by the light beam incident on the cylindrical mirror 77 and the light beam reflected by the cylindrical mirror 77.

Figure 7:
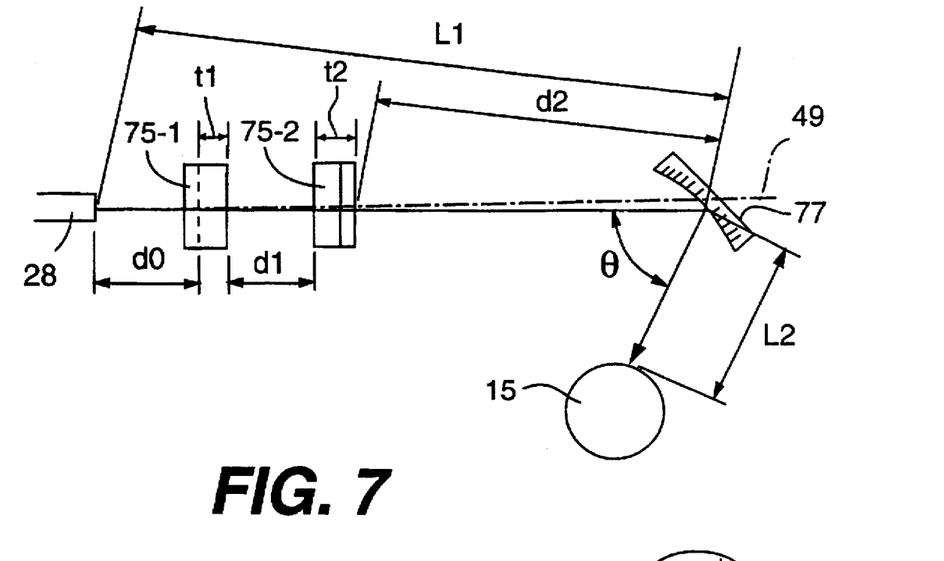
FIG. 7 is a schematic view of an optical system at a reflecting side of a polygon mirror, for explaining optical parameters of the first embodiment.

The optical system at the reflecting side of the polygon mirror 28 is illustrated schematically in FIG. 7. In FIG. 7, $d_0$ is the interval, on the optical axis, between the lens 75-1 and a reference position of the polygon mirror 28 (e.g., the position at which the optical axis 49 and the deflecting surface 28A are orthogonal); $t_1$ is the thickness, on the optical axis, of the lens 75-1; $d_1$ is the interval on the optical axis, between the lens 75-1 and the lens 75-2; $t_2$ is the thickness, on the optical axis, of the lens 75-2; $d_2$ is the interval, on the optical axis, between the lens 75-2 and the cylindrical mirror 77; $L_1$ is the interval, on the optical axis, between the polygon mirror 28 and the cylindrical mirror 77; and $L_2$ is the optical distance between the cylindrical mirror 77 and the surface of the photosensitive drum 15.

As illustrated in FIG. 7, the cylindrical mirror 77 is disposed at a position at which the deviation of the position of the light beam on the photosensitive drum 15, which is caused by the tilting error of the deflecting surface 28A of the polygon mirror 28, can be finely corrected by the power of the cylindrical mirror 77 in the subscanning direction. The subscanning direction conjugate magnification M is set such that the ability to correct the tilting error and the ability to make the curvature of field small are achieved simultaneously.

The subscanning direction conjugate magnification M is expressed by the following equation wherein the optical distance between the polygon mirror 28 and the cylindrical mirror 77 is $L_{1'}$.

$$M = L_2/L_{1'} \qquad \ldots (2)$$

The optical distance $L_{1'}$ is expressed by the following equation wherein $n_1$, $n_2$ are the refractive indices of the lens 75-1 and the lens 75-2, respectively.

$$L_{1'} = L_1 - (t_1(1-1/n_1) + t_2(1-1/n_2)) \qquad \ldots (5)$$

The interval $L_1$ between the polygon mirror 28 and the cylindrical mirror 77 in FIG. 7 is expressed by the following equation.

$$L_1 = d_0 + t_1 + d_1 + t_2 + d_2 \qquad \ldots (4)$$

The cylindrical mirror 77 has the role of maintaining the optically conjugate relationship between the f θ lens system 75, which has power only in the main scanning direction, and the deflecting surface 28A of the polygon mirror 28 and the scan surface of the photosensitive drum 15.

Next, operation of the present embodiment will be described.

The semiconductor laser 25 emits a light beam which is diffused light whose spread angle in a direction corresponding to the main scanning direction is greater than the spread angle thereof in a direction corresponding to the subscanning direction. Because the semiconductor laser 25 is disposed further toward the inner side than the focal point position of the collimator lens 71, due to the collimator lens 71, the light beam proceeds substantially parallel to the direction corresponding to the subscanning direction and is made into divergent light which gradually diverges in the direction corresponding to the main scanning direction. The beam width, in the direction corresponding to the subscanning direction, of the light beam which is the divergent light is limited by the opening aperture 72.

The light beam which passes through the opening aperture 72 is, by the cylindrical lens 73, made into convergent light which converges only in the direction corresponding to the subscanning direction. The light beam which passes through the cylindrical lens 73 is reflected by the plane mirror 74 and made incident on the lens 75-2 and then the lens 75-1 of the f θ lens system 75. Here, because the f θ lens system 75 has power only in the main scanning direction, the light beam which passes through the f θ lens system 75 advances directly without being refracted in the subscanning direction, and is made incident on the deflecting surface 28A of the polygon mirror 28. The light beam which is incident on the deflecting surface 28A converges in a vicinity of the surface of the deflecting surface 28A in the direction corresponding to the subscanning direction. At this time, because the surface width of each of the deflecting surfaces 28A is smaller than the light beam of converged light, the light beam is focused as a line image which is long in the main scanning direction and which extends over a plurality of deflecting surfaces 28A.

The focused light beam is reflected and deflected by the plurality of deflecting surfaces 28A and is again made incident on the f θ lens system 75. The light beam which is incident on the f θ lens system 75 is, by the power of the f θ lens system 75 only in the main scanning direction, converged in the main scanning direction in a vicinity of the surface of the photosensitive drum 15. When the light beam passes through the f θ lens system 75, after being reflected by the plane mirror 76, the light beam reaches and is reflected by the cylindrical mirror 77.

The light beam reflected by the cylindrical mirror 77 is irradiated onto the surface of the photosensitive drum 15. At this time, the light beam is converged in the vicinity of the surface of the photosensitive drum 15 in the subscanning direction (due to the effect of the cylindrical lens 73) and in the main scanning direction (due to the effect of the f θ lens system 75). The light beam is irradiated as a substantially circular light spot of a predetermined irradiated beam diameter K onto the surface of the photosensitive drum 15, and is scanned at a uniform speed in the main scanning direction.

Here, because the cylindrical mirror 77 has power only in the subscanning direction, as illustrated in FIG. 7, the subscanning direction positional deviation of the light spot on the photosensitive drum 15, which positional deviation is caused by the tilting error of the polygon mirror 28, can be made small.

Because the polygon mirror 28 rotates in the direction of arrow P at a substantially uniform angular speech, the advancing direction of the light beam reflected at the deflecting surfaces 28A varies, and accordingly, the position of the light spot irradiated on the surface of the photosensitive drum 15 also varies. At this time, due to the effect of the f θ lens system, the light spot scans the surface of the photosensitive drum 15 in units of one or more lines at a substantially uniform speed in the direction of arrow 79 (the main scanning direction).

As mentioned previously, the photosensitive drum 15 rotates at a predetermined, constant rotational speed in the direction of arrow Q around the axis W. Therefore, due to the rotation of the photosensitive drum 15 at a constant rotational speed and due to the movement of the light spot at a substantially uniform speed in the direction of arrow 79, the surface of the photosensitive drum 15 is scanned at a predetermined scanning speed. The modulation of the image signal per unit of one or more lines begins after a predetermined period of time has elapsed from the time that the SOS sensor 81 detects the SOS beam.

In the optical scanning device having the above-described structure, in order to simultaneously achieve the ability to correct the tilting error of the polygon mirror and the ability to correct the curvature of field of the subscanning direction, it is preferable that the magnification M in the subscanning direction satisfies the following inequality.

$$0.2<M<0.6 \quad \ldots (5)$$

The reasons why above inequality (5) is established are described hereinafter. In the following explanation, the application of the scanning optical system, which is formed by the cylindrical mirror 77 and the f θ lens system 75 having power only in the main scanning direction, to a double pass/front incident system structure is supposed.

When $M \leq 0.2$, presupposing the real power value of the actual, total tilting error of the polygon mirror 28 and considering the tolerance (±1 mm) of the radius of curvature of the cylindrical mirror 77, when the deviation (about 1 mm) of the conjugate point at the center and sides of the optical system itself is added, the conjugate point of the correction of the tilting error deviates about ±2 mm at the center or the sides. Therefore, the subscanning direction positional deviation generated for each one rotation of the polygon mirror 28 exceeds 6 µm, and a problem arises in that the banding, which is one aspect of the image quality, is not at an acceptable level.

Figure 5:
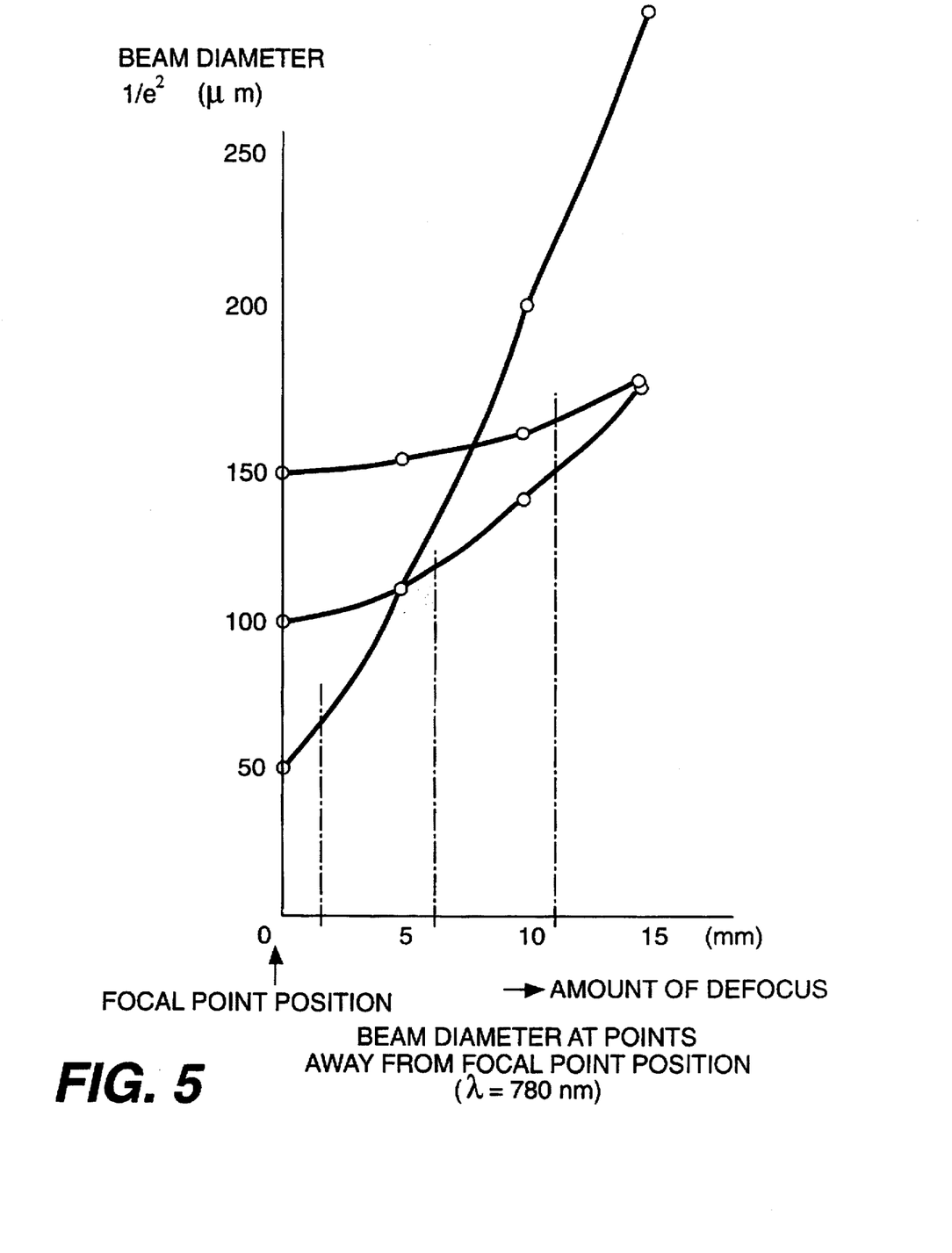
FIG. 5 is a graph for explaining a state in which beam sizes become wider at positions away from a focal point position.

On the other hand, when $M \geq 0.6$, a problem arises in that the curvature of field in the subscanning direction exceeds 2 mm. To take the case of a certain scanning angle as an example, currently, the beam diameter on the photosensitive body is usually about 50 µm. Therefore, a depth of only about ±2 mm can be guaranteed. Considering the tolerance of the parts and the tolerance of adjustments, it is difficult to keep the increase in the beam diameter to about 15 µm, and the image quality is affected (thin lines become thick and the like). For reference, FIG. 5 illustrates that the beam diameter becomes thicker in accordance with an increase in distance from the focal point position, for each of three light beams having respectively different beam diameters.

In the optical scanning device relating to the present first embodiment, even if a lens having power in only the main scanning direction is used in the f θ lens system 75, positional deviations of the light spot irradiated onto the photosensitive drum 15 can be finely corrected.

Figure 3B:
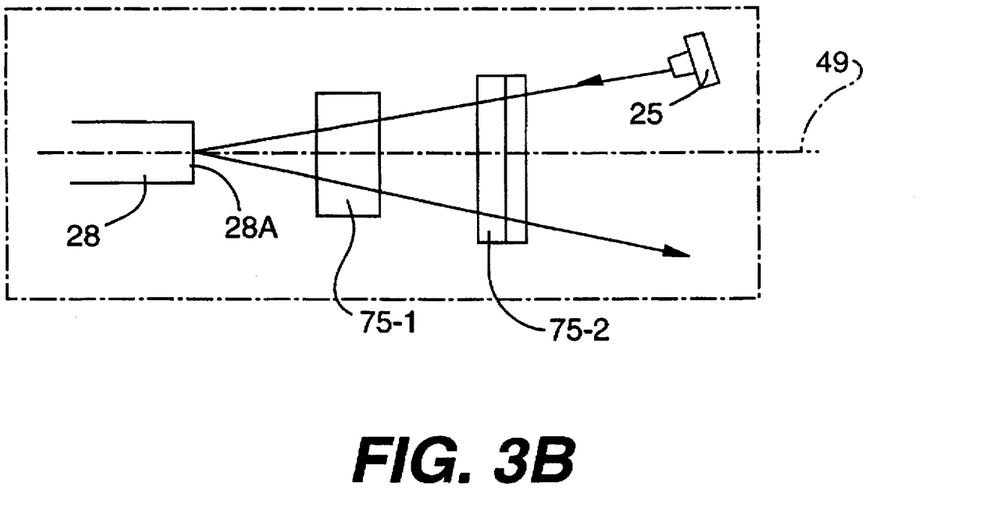
FIG. 3B is a side view of a case in which a double pass/front incident system is applied to an optical system relating to the first embodiment.

The following advantages thereby arise. As illustrated in FIG. 3A, in a front incident/double pass optical system, in a case in which a conventional f θ lens system formed by a lens 41 and a lens 42 having power in the subscanning direction as well is used, the light beam is refracted in the subscanning direction as well. Therefore, the semiconductor laser 25 must be disposed at a position which is relatively far from the optical axis of the f θ lens system. In contrast, in the present first embodiment, the lens 75-1 and the lens 75-2 do not have power in the subscanning direction. Therefore, as illustrated in FIG. 3B, the light beam advances directly without being refracted in the subscanning direction. Accordingly, the semiconductor laser 25 or the like can be disposed at a position nearer to the lens optical axis than in the conventional example of FIG. 3A. In this way, the f θ lens 75 system and the optical scanning device can be made flat, and an apparatus, such as an image forming apparatus or the like, in which the f θ lens system 75 and the optical scanning device are used can be made more compact and less expensive. In particular, in the present first embodiment, because the f θ lens system 75 is formed such that the respective planar surfaces of the two lenses oppose each other, the f θ lens system 75 can be made most compact.

Figure 9:
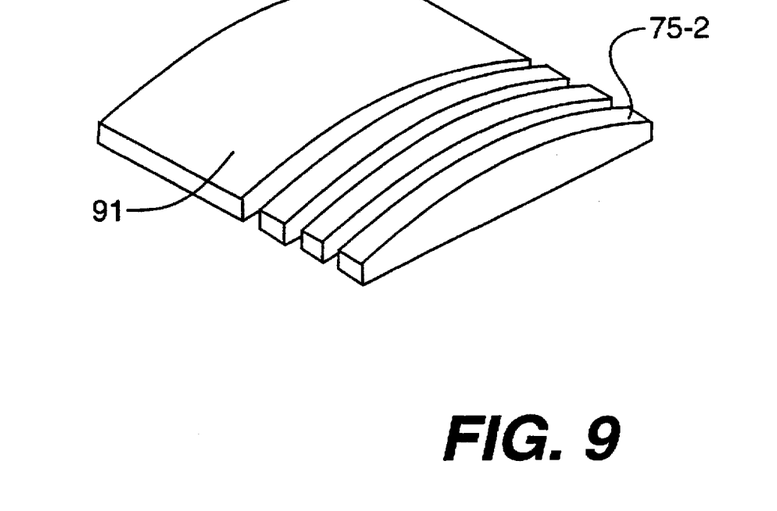
FIG. 9 is a perspective view fundamentally illustrating a state of manufacturing of a plano-convex cylindrical lens forming an f θ lens system relating to the first embodiment.

Using the f θ lens system 75 having power in only the main scanning direction provides advantages from a manufacturing standpoint as well. More specifically, as illustrated in FIG. 9, first, a single plano-convex shaped lens is formed as a cylindrical lens 91. By sectionally cutting the cylindrical lens 91 at equal intervals, a plurality of lenses 75-2 can be formed. In this way, as compared with the conventional art in which each lens had to be formed so as to have power in the subscanning direction as well, the cost per lens can be greatly reduced.

Figure 10:
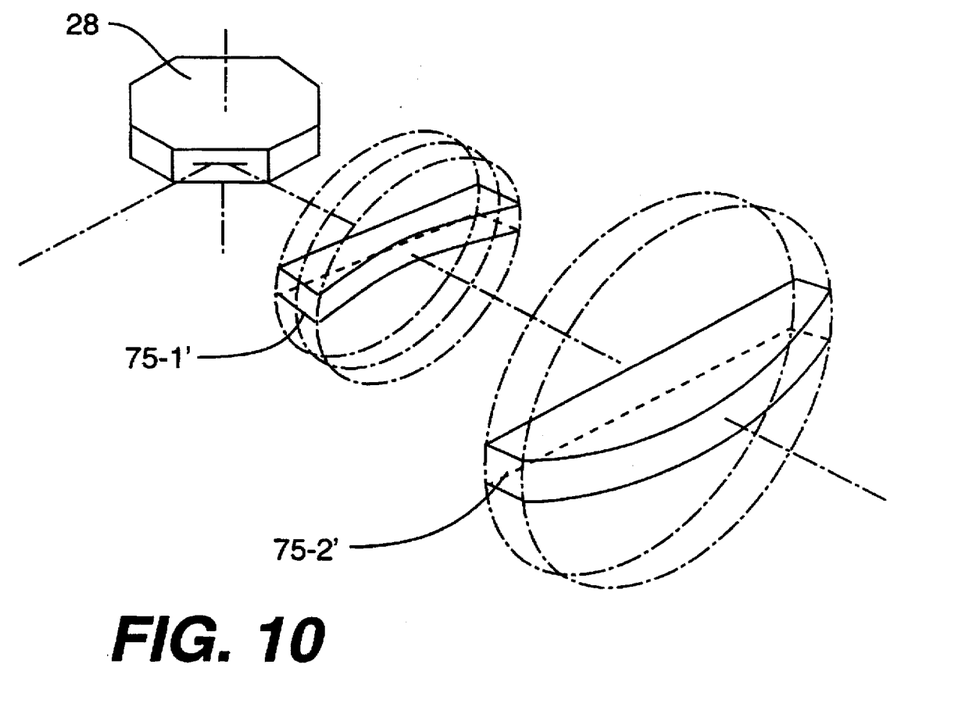
FIG. 10 is a view for comparing a case in which a conventional spherical lens is used in the f θ lens system with a case relating to the present invention in which a flat lens having power in only the main scanning direction is used in the f θ lens system.

The following advantage is also obtained. FIG. 10 illustrates a case in which a light beam reflected from the polygon mirror 28 passes through two lenses, lens 75-1' and lens 75-2'. In FIG. 10, the lenses 75-1' and 75-2' having power in only the main scanning direction are illustrated by the solid lines, whereas conventional lenses having power in the subscanning direction as well are illustrated by the one-dot chain lines. As illustrated in FIG. 10, in order to have power in the subscanning direction as well, the conventional lens cannot be formed as a flat lens, and is formed as a spherical lens. As a result, as compared with conventional lenses, the lens 75-1' and the lens 75-2' contribute to a savings in materials and to making the optical scanning device more compact.

As described above, an inexpensive, high-performance optical scanning device can be provided by using the scanning optical system formed by the f θ lens 75 system, which has power in only the main scanning direction, and the cylindrical mirror 77, which has power in only the subscanning direction.

Second Embodiment

In a double pass/front incident optical system, a drawback arises in that the light incident on the f θ lens system 75 from the semiconductor laser 25 is reflected and reaches the photosensitive drum 15 and adversely affects the image quality. Therefore, it is necessary to tilt the optical axis of the f θ lens system 75 with respect to a plane orthogonal to the respective deflecting surfaces 28A of the polygon mirror 28. Such a structure will be described hereinafter as the second embodiment.

Figure 8A:
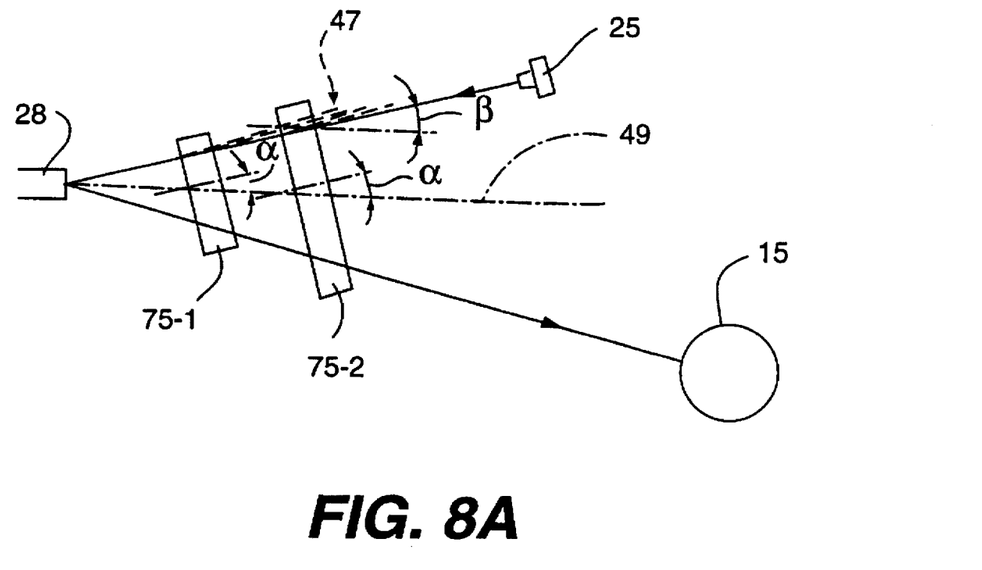
FIG. 8A is a schematic view of an optical system of an optical scanning device relating to a second embodiment, and illustrates a case in which an f θ lens system is disposed so as to be tilted such that an angle of incidence of an incident beam onto the f θ lens system is small.
Figure 8B:
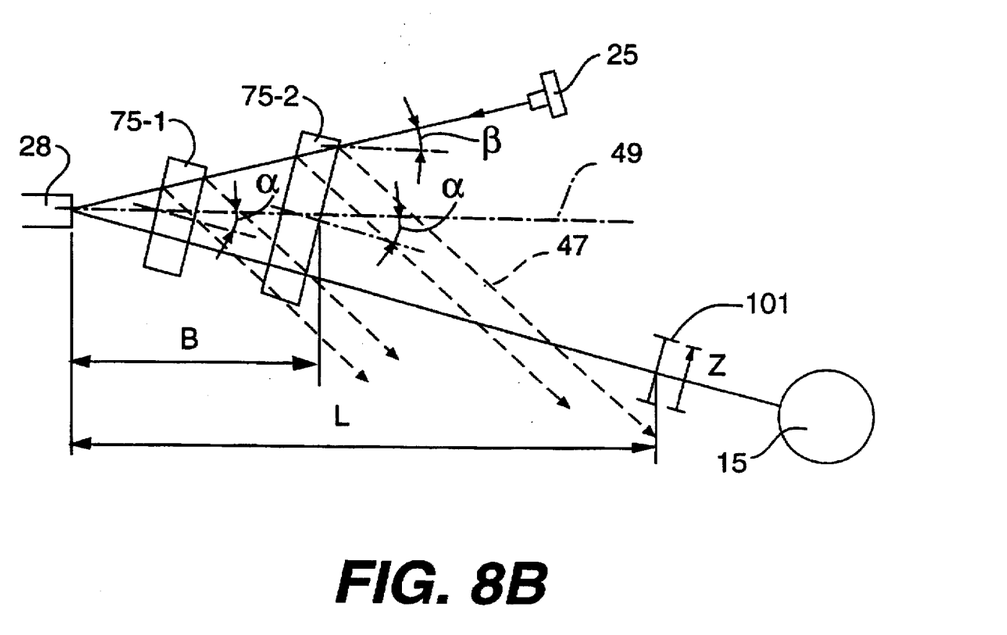
FIG. 8B is a schematic view of the optical system of the optical scanning device relating to the second embodiment, and illustrates a case in which the f θ lens system is disposed so as to be tilted such that an angle of incidence of an incident beam onto the f θ lens system is large.

Schematic side views of optical systems at the reflecting sides of polygon mirrors 28 for two cases in which the f θ lens system 75 is tilted are illustrated in FIGS. 8A and 8B. In FIGS. 8A and 8B, structural elements which are the same as those of the first embodiment are denoted by the same reference numerals, and description thereof will be omitted.

As illustrated in FIG. 8A, the lens 75-1 and the lens 75-2 are disposed so as to be tilted in a direction in which the incident angle onto the f θ lens system 75 of the incident beam from the semiconductor laser 25 becomes small, such that the optical axes of the lens 75-1 and the lens 75-2 form predetermined angles α (α>0) with respect to a plane (including the optical axis 49) which is orthogonal to all of the deflecting surfaces 28A of the polygon mirror 28. Here, if the angle formed by the incident beam and the optical axis 49 is β, the relationship between α and β is set in accordance with the following inequality.

$$\alpha > \beta \quad \ldots (6)$$

Namely, the angle α formed by the optical axis of the f θ lens system 75 with respect to the optical axis 49 is set to be greater than the angle of the incident beam with respect to the optical axis 49.

When an incident beam from the semiconductor laser 25 is incident at the optical system structured as described above, a portion of the light beam is reflected by the surface of the f θ lens system 75. This reflected light 47 advances along the optical path as illustrated by the dotted line in the figure. Without being incident on an optical member 101 (refer to FIG. 8B), the reflected light 47 advances along the optical path at the side of the incident beam opposite the side at which the photosensitive drum 15 is disposed, and does not reach the photosensitive drum 15. In this way, adverse effects on the image quality due to the reflected light 47 can be prevented.

However, it is preferable that the upper limit of the angle α is set in accordance with the following inequality.

$$\alpha < 5\beta \qquad \ldots (7)$$

When $\alpha \geq 5\beta$, the conjugate point of the correction of the tilting error deviates 2 mm or more at the center and the sides, and good image quality (good banding) cannot be maintained over the entire area of the photosensitive body.

As long as the condition of above inequality (6) is satisfied, the angles of tilt of the lens 75-1 and the lens 75-2 may be respectively different.

FIG. 8B is a schematic side view of a case in which the f θ lens system 75 is disposed so as to be tilted in a direction different than the direction in which the f θ lens system 75 illustrated in FIG. 8A is tilted.

As illustrated in FIG. 8B, the lens 75-1 and the lens 75-2 are disposed so as to be tilted in a direction in which the incident angle of the incident beam onto the f θ lens system 75 is large, such that the optical axes of the lens 75-1 and the lens 75-2 form predetermined angles α with respect to a plane (including the optical axis 49) which is orthogonal to all of the deflecting surfaces 28A of the polygon mirror 28. The optical member 101, whose subscanning direction size is z, is disposed at a position which is the furthest away, in the optical system, from the f θ lens system in the reflecting direction of the polygon mirror 28. The optical member 101 may be, for example, a reflecting mirror, a window for dust-proofing, or the like.

As shown in FIG. 8B, the above-described optical system is set so that the following inequality is established, wherein L is a distance which is the optical distance from the deflecting surface 28A of the polygon mirror 28 to the optical member 101 which optical distance is projected on the optical axis 49, and B is the distance from the deflecting surface 28A to the lens 75-2, i.e., from the polygon mirror 28 to the furthest surface.

$$\tan(2\alpha+\beta)\times L - \tan\beta \times (B+L) > Z/2 \qquad \ldots (8)$$

When an incident beam from the semiconductor laser 25 is incident at the optical system structured as described above, a portion of the light beam is reflected at the surface of the f θ lens system 75. The reflected light 47 advances along the optical path as shown by the dotted line in the figure, and passes to a region below the optical member 101 without being incident on the optical member 101. Namely, the reflected light 47 passes by the optical element 101 and does not reach the photosensitive body of the photosensitive drum 15. In this way, adverse effects on the image quality due to the reflected light 47 are prevented.

However, it is preferable that the upper limit of the angle α is set in accordance with the following inequality.

$$\alpha < 2\beta \qquad \ldots (9)$$

Namely, when $\alpha \geq 2\beta$, the beam diameter in the main scanning direction at the sides becomes large and is not of a quality satisfactory for actual use.

In a case in which the f θ lens system is a group of two lenses, it is easy for the reflected light of the lens 75-2, which is far from the polygon mirror 28, to be incident on the optical member 101. Therefore, if the angle at which the lens 75-2 is tilted satisfies the condition of inequality (8), it is not absolutely necessary for the angle at which the lens 75-1, which is nearer to the polygon mirror 28, is tilted to satisfy the condition of inequality (8).

Usually, when the f θ lens system 75 is tilted, the optical performance deteriorates. However, by providing certain conditions for the angle of tilting of the f θ lens and the angle of the incident light which is incident on the f θ lens, the optical performance can be improved even more.

Figure 11:
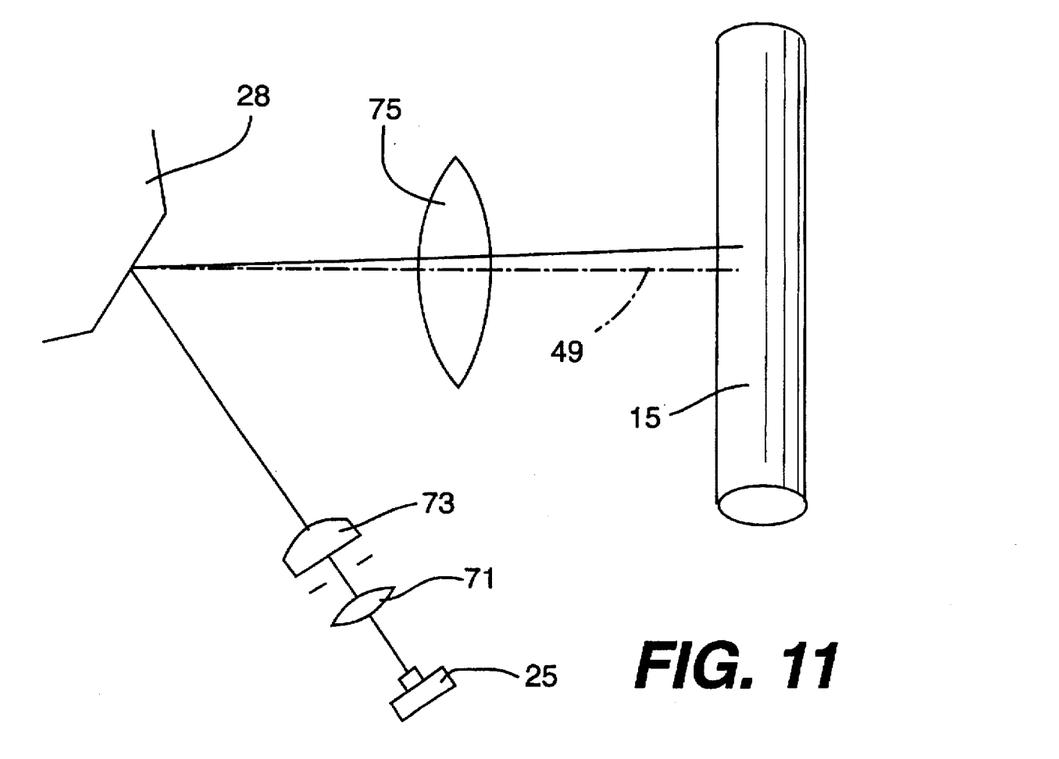
FIG. 11 is a schematic view of an optical system, other than a double pass/front incident system, to which the present invention can be applied.

Embodiments of the present invention have been described above, but the present invention is not to be limited to the above examples. For example, the present invention may also be applied to an optical system other than a double pass/front incident optical system, for example, the optical system illustrated in FIG. 11. In FIG. 11, structural elements which are the same as those of FIG. 1 are denoted by the same reference numerals, and description thereof is omitted.

In the optical system of FIG. 11, the light beam emitted from the laser diode assembly 70 is directly incident on the polygon mirror 28, without passing through the f θ lens system 75, from a direction in which the light beam forms a predetermined angle in the main scanning direction with respect to the optical axis 49.

The following are design examples of the optical system of the optical scanning device relating to the first embodiment of the present invention.

interval between polygon mirror 28 and lens 75-1: $d_0=18.5$ mm radius of curvature (only in main scanning direction) of lens 75-1 at polygon mirror side: S1-R=-170.43 mm curvature of lens 75-1 at side far from polygon mirror 28: S2-R=∞ thickness of lens 75-1: $t_1=9$ mm interval between lens 75-1 and lens 75-2: $d_1=25.998$ mm curvature of lens 75-2 at polygon mirror 28 side: S1-R=∞ radius of curvature (only in main scanning direction) of lens 75-1 at side far from polygon mirror 28: S2-R= 122.67 mm thickness of lens 75-2: $t_2=10$ mm refractive index of lens 75-2: $n_2=1.712268$ (wavelength= 780 nm)

interval between lens 75-2 and cylindrical mirror 77: $d_2=291.8$ mm radius of curvature (only in subscanning direction) of cylindrical mirror 77: R=-163.95 mm angle of incidence onto/emergence from cylindrical mirror 77: θ=71.24° interval between cylindrical mirror 77 and photosensitive drum 15: $L_2=82.5$ mm interval between polygon mirror 28 and cylindrical mirror 77: $L_1=d_0+t_1+d_1+t_2+d_2=355.298$ mm optical path length between polygon mirror 28 and cylindrical mirror 77: $L_1'=L_1-(t_1(1-1/n_1)+t_2(1-1/n_2))= 347.24$ mm conjugate magnification in subscanning direction: $M=L_2/L_1'=0.238$ In the above-described structure, the difference in spot size at the center and the sides in the main scanning direction can be kept to 10 μm or less, the difference in the conjugate point at the center and the sides in the subscanning direction can be kept to 0.7 mm, and the curvature of field in the subscanning direction (in view of the difference between the center and the sides) can be kept to 1 mm or less.

Design examples of the optical system of the optical scanning device of the second embodiment are given hereinafter.

First, design values are given for the case illustrated in FIG. 8A in which the lens 75-1 and the lens 75-2 are disposed so as to be tilted in a direction in which the incident angle of an incident beam onto the f θ lens system 75 becomes small.

$\alpha = 4°$ $\beta = 1.2°$

Inequality (6) and inequality (7) are simultaneously established by these values. Therefore, adverse effects on image quality caused by the reflected light can be prevented, and a good image quality can be maintained over the entire area of the photosensitive body. Further, with the above-described design values, the difference, at the center and the sides, in the size of the light spot on the photosensitive drum 15 in the main scanning direction can be kept to about 2 μm.

Next, design values are given for the case illustrated in FIG. 8B in which the lens 75-1 and the lens 75-2 are disposed so as to be tilted in a direction in which the incident angle of an incident beam onto the f θ lens system 75 becomes large.

$B = d_0 + t_1 + d_1 + t_2 - (t_1(1 - 1/n_1) + t_2(1 - 1/n_2)) = 55.44$ mm $L = 200$ mm $Z = 10$ mm $\alpha = 1.5°$ $\beta = 1.2°$ If the above design values are substituted into the left side of inequality (8), $\tan(2\alpha+\beta) \times L - \tan\beta \times (B+L) = 9.3$ mm. Because this value is greater than $Z/2 = 5$ mm, which is obtained by substituting the above design value for Z into the right side of inequality (8), the condition of inequality (8) is satisfied. Similarly, inequality (9) is also established.

As described above, because inequality (8) and inequality (9) are established simultaneously, adverse effects on image quality caused by the reflected light can be prevented, and the beam diameter in the main scanning direction at the sides can be kept to a fixed value or less so that good image quality can be maintained over the entire area of the photosensitive body. Further, with the above-listed design values, the difference, at the center and the sides, in the conjugate point of the correction of the tilting error in the subscanning direction is 0.3 mm, and the difference, at the center and the sides, in the curvature of field in the subscanning direction is 0.5 mm.

What is claimed is:

1. An optical scanning device comprising:

a beam diameter shaping optical system which shapes a diameter of a light beam from a light source and focuses the light beam as a line image which is long in a direction corresponding to a main scanning direction;

deflecting means having a reflecting surface at one of a focusing position and a vicinity of the focusing position of the line image, said deflecting means deflecting a light beam, which is incident on said deflecting means, at a uniform angular speed in the direction corresponding to the main scanning direction;

a cylindrical mirror disposed at a light beam reflecting side of said deflecting means, said cylindrical mirror having power to converge a light beam in only a subscanning direction which is orthogonal to the main scanning direction, and converging a light beam on a surface-to-be-scanned; and an f θ lens system disposed between said deflecting means and said cylindrical mirror, and having power to converge a light beam only in a main scanning direction, and converging a light beam, which is incident on said f θ lens system, onto the surface-to-be-scanned via said cylindrical mirror so that a light spot is scanned at a uniform speed.

2. An optical scanning device according to claim 1, wherein said f θ lens system is formed by two lenses, and one surface of each lens is planar, and another surface of each lens is formed by a surface having power to converge a light beam only in the main scanning direction.

3. An optical scanning device according to claim 2, wherein given that magnification M in the subscanning direction is a value which is equal to an optical distance between the surface-to-be-scanned and a reflecting surface of said cylindrical mirror divided by an optical distance between the reflecting surface of said cylindrical mirror and the reflecting surface of said deflecting means, $0.2 < M < 0.6$.

4. An optical scanning device according to claim 3, wherein said f θ lens system is disposed such that a light beam incident on said deflecting means and a light beam reflected and deflected by said deflecting means both pass through said f θ lens system and such that said f θ lens system makes a light beam incident on said deflecting means from a center of a scan angle formed by the light beam reflected and deflected by said deflecting means.

5. An optical scanning device according to claim 4, wherein said f θ lens system is disposed such that an optical axis of said f θ lens system forms a predetermined angle α with respect to a plane orthogonal to the reflecting surface of said deflecting means, and is disposed so as to be tilted in a direction in which an angle of incidence of a light beam incident on said f θ lens system is large, and given that B is a distance which is the optical distance, between said deflecting means and a surface of said f θ lens system furthest from said deflecting means, which optical distance has been projected on a plane orthogonal to the reflecting surface of said deflecting means, L is a distance which is the optical distance, between the reflecting surface of said deflecting means and an optical member which is furthest from said deflecting means, which optical distance has been projected onto a plane orthogonal to the reflecting surface of said deflecting means, Z is a subscanning direction size of the optical member;

α is an angle at which the optical axis of said f θ lens system is tilted with respect to a plane orthogonal to the reflecting surface of said deflecting means, and β is an angle formed by a light beam incident on said f θ lens system with respect to a plane orthogonal to the reflecting surface of said deflecting means, the following inequality is satisfied:

$\tan(2\alpha+\beta) \times L - \tan\beta \times (B+L) > Z/2$.

6. An optical scanning device according to claim 5, wherein the inequality $\alpha < 2\beta$ is further satisfied.

7. An optical scanning device according to claim 3, wherein said f θ lens system is disposed such that an optical axis of said f θ lens system forms a predetermined angle α with respect to a plane orthogonal to the reflecting surface of said deflecting means, and is disposed so as to be tilted in a direction in which an angle of incidence of a light beam incident on said f θ lens system is small, and given that β is an angle formed by a light beam incident on said f θ lens system with respect to a plane orthogonal to the reflecting surface of said deflecting means, the inequality α>β is satisfied.

8. An optical scanning device according to claim 7, wherein the inequality α<5β is further satisfied.

9. An optical scanning device according to claim 2, wherein said f θ lens system is disposed such that a light beam incident on said deflecting means and a light beam reflected and deflected by said deflecting means both pass through said f θ lens system and such that said f θ lens system makes a light beam incident on said deflecting means from a center of a scan angle formed by the light beam reflected and deflected by said deflecting means.

10. An optical scanning device according to claim 9, wherein said f θ lens system is disposed such that an optical axis of said f θ lens system forms a predetermined angle α with respect to a plane orthogonal to the reflecting surface of said deflecting means, and is disposed so as to be tilted in a direction in which an angle of incidence of a light beam incident on said f θ lens system is large, and given that B is a distance which is the optical distance, between said deflecting means and a surface of said f θ lens system furthest from said deflecting means, which optical distance has been projected on a plane orthogonal to the reflecting surface of said deflecting means, L is a distance which is the optical distance, between the reflecting surface of said deflecting means and an optical member which is furthest from said deflecting means, which optical distance has been projected onto a plane orthogonal to the reflecting surface of said deflecting means, Z is a subscanning direction size of the optical member;

α is an angle at which the optical axis of said f θ lens system is tilted with respect to a plane orthogonal to the reflecting surface of said deflecting means, and β is an angle formed by a light beam incident on said f θ lens system with respect to a plane orthogonal to the reflecting surface of said deflecting means, the following inequality is satisfied:

$$\tan(2\alpha+\beta) \times L - \tan\beta \times (B+L) > Z/2.$$

11. An optical scanning device according to claim 10, wherein the inequality α<2β is further satisfied.

12. An optical scanning device according to claim 2, wherein said f θ lens system is disposed such that an optical axis of said f θ lens system forms a predetermined angle α with respect to a plane orthogonal to the reflecting surface of said deflecting means, and is disposed so as to be tilted in a direction in which an angle of incidence of a light beam incident on said f θ lens system is small, and given that β is an angle formed by a light beam incident on said f θ lens system with respect to a plane orthogonal to the reflecting surface of said deflecting means, the inequality α>β is satisfied.

13. An optical scanning device according to claim 12, wherein the inequality α<5β is further satisfied.

14. An optical scanning device according to claim 1, wherein given that magnification M in the subscanning direction is a value which is equal to an optical distance between the surface-to-be-scanned and a reflecting surface of said cylindrical mirror divided by an optical distance between the reflecting surface of said cylindrical mirror and the reflecting surface of said deflecting means, 0.2<M<0.6.

15. An optical scanning device according to claim 14, Wherein said f θ lens system is disposed such that a light beam incident on said deflecting means and a light beam reflected and deflected by said deflecting means both pass through said f θ lens system and such that said f θ lens system makes a light beam incident on said deflecting means from a center of a scan angle formed by the light beam reflected and deflected by said deflecting means.

16. An optical scanning device according to claim 15, wherein said f θ lens system is disposed such that an optical axis of said f θ lens system forms a predetermined angle α with respect to a plane orthogonal to the reflecting surface of said deflecting means, and is disposed so as to be tilted in a direction in which an angle of incidence of a light beam incident on said f θ lens system is large, and given that B is a distance which is the optical distance, between said deflecting means and a surface of said f θ lens system furthest from said deflecting means, which optical distance has been projected on a plane orthogonal to the reflecting surface of said deflecting means, L is a distance which is the optical distance, between the reflecting surface of said deflecting means and an optical member which is furthest from said deflecting means, which optical distance has been projected onto a plane orthogonal to the reflecting surface of said deflecting means, Z is a subscanning direction size of the optical member;

α is an angle at which the optical axis of said f θ lens system is tilted with respect to a plane orthogonal to the reflecting surface of said deflecting means, and β is an angle formed by a light beam incident on said f θ lens system with respect to a plane orthogonal to the reflecting surface of said deflecting means, the following inequality is satisfied:

$$\tan(2\alpha+\beta) \times L - \tan\beta \times (B+L) > Z/2.$$

17. An optical scanning device according to claim 16, wherein the inequality α<2β is further satisfied.

18. An optical scanning device according to claim 14, wherein said f θ lens system is disposed such that an optical axis of said f θ lens system forms a predetermined angle α with respect to a plane orthogonal to the reflecting surface of said deflecting means, and is disposed so as to be tilted in a direction in which an angle of incidence of a light beam incident on said f θ lens system is small, and given that β is an angle formed by a light beam incident on said f θ lens system with respect to a plane orthogonal to the reflecting surface of said deflecting means, the inequality α>β is satisfied.

19. An optical scanning device according to claim 18, wherein the inequality α<5β is further satisfied.

20. An optical scanning device according to claim 1, wherein said f θ lens system is disposed such that a light beam incident on said deflecting means and a light beam reflected and deflected by said deflecting means both pass through said f θ lens system and such that said f θ lens system makes a light beam incident on said deflecting means from a center of a scan angle formed by the light beam reflected and deflected by said deflecting means.

21. An optical scanning device according to claim 20, wherein said f θ lens system is disposed such that an optical axis of said f θ lens system forms a predetermined angle α with respect to a plane orthogonal to the reflecting surface of said deflecting means, and is disposed so as to be tilted in a direction in which an angle of incidence of a light beam incident on said f θ lens system is large, and given that B is a distance which is the optical distance, between said deflecting means and a surface of said f θ lens system furthest from said deflecting means, which optical distance has been projected on a plane orthogonal to the reflecting surface of said deflecting means, L is a distance which is the optical distance, between the reflecting surface of said deflecting means and an optical member which is furthest from said deflecting means, which optical distance has been projected onto a plane orthogonal to the reflecting surface of said deflecting means, Z is a subscanning direction size of the optical member;

α is an angle at which the optical axis of said f θ lens system is tilted with respect to a plane orthogonal to the reflecting surface of said deflecting means, and β is an angle formed by a light beam incident on said f θ lens system with respect to a plane orthogonal to the reflecting surface of said deflecting means, the following inequality is satisfied:

$$\tan(2\alpha+\beta) \times L - \tan\beta \times (B+L) > Z/2.$$

22. An optical scanning device according to claim 21, wherein the inequality $\alpha < 2\beta$ is further satisfied.

23. An optical scanning device according to claim 1, wherein said f θ lens system is disposed such that an optical axis of said f θ lens system forms a predetermined angle α with respect to a plane orthogonal to the reflecting surface of said deflecting means, and is disposed so as to be tilted in a direction in which an angle of incidence of a light beam incident on said f θ lens system is small, and given that β is an angle formed by a light beam incident on said f θ lens system with respect to a plane orthogonal to the reflecting surface of said deflecting means, the inequality $\alpha > \beta$ is satisfied.

24. An optical scanning device according to claim 23, wherein the inequality $\alpha < 5\beta$ is further satisfied.

* * * * *